United States Patent
Poloczek et al.

(10) Patent No.: US 11,967,727 B2
(45) Date of Patent: Apr. 23, 2024

(54) METHOD FOR MANUFACTURING A CRASH FRAME OF A BATTERY COMPARTMENT FOR BATTERY ELECTRIC VEHICLES

(71) Applicant: Outokumpu Oyj, Helsinki (FI)

(72) Inventors: Martin Poloczek, Krefeld (DE); Thomas Hündgen, Juechen (DE); Stefan Lindner, Willich (DE)

(73) Assignee: Outokumpu Oyj, Helsinki (FI)

( * ) Notice: Subject to any disclaimer, the term of this patent is extended or adjusted under 35 U.S.C. 154(b) by 396 days.

(21) Appl. No.: 17/278,021

(22) PCT Filed: Oct. 8, 2019

(86) PCT No.: PCT/EP2019/077179
§ 371 (c)(1),
(2) Date: Mar. 19, 2021

(87) PCT Pub. No.: WO2020/074486
PCT Pub. Date: Apr. 16, 2020

(65) Prior Publication Data
US 2021/0351469 A1    Nov. 11, 2021

(30) Foreign Application Priority Data
Oct. 9, 2018  (EP) ..................... 18199378

(51) Int. Cl.
*H01M 50/242*    (2021.01)
*B60K 1/00*    (2006.01)
(Continued)

(52) U.S. Cl.
CPC ....... *H01M 50/242* (2021.01); *H01M 10/658* (2015.04); *H01M 50/224* (2021.01);
(Continued)

(58) Field of Classification Search
CPC ........ H01M 2220/20; B32B 2307/102; B60R 13/0869; B60Y 2306/01
See application file for complete search history.

(56) References Cited

U.S. PATENT DOCUMENTS

| | | | | |
|---|---|---|---|---|
| 2,481,046 A | * | 9/1949 | Scurlock | ............... E04C 2/3405 |
| | | | | 428/116 |
| 3,166,831 A | * | 1/1965 | Keith | ..................... B29C 44/16 |
| | | | | 29/890.039 |

(Continued)

FOREIGN PATENT DOCUMENTS

| | | |
|---|---|---|
| CN | 206938686 U | 1/2018 |
| DE | 10103131 A1 | 8/2002 |

(Continued)

OTHER PUBLICATIONS

WO-2012025594-A1 machine translation (Year: 2012).*

(Continued)

*Primary Examiner* — Michael W Hotchkiss
(74) *Attorney, Agent, or Firm* — Quinn IP Law (57) ABSTRACT

The invention relates to a manufacturing method for a crash frame of a battery compartment for electric drive vehicles by using metallic sheets which are arranged on top of one another and fixed together and which form in a following step a space by using an inner active media forming process to create walls of a crash frame whereby the space works as a deformation space to protect the battery modules inside the battery compartment against an impact. The invention further relates to the use of the crash frame for a battery compartment.

16 Claims, 5 Drawing Sheets

(51) Int. Cl.
  *B60R 13/08*   (2006.01)
  *B62D 21/15*   (2006.01)
  *B62D 29/00*   (2006.01)
  *H01M 10/658*  (2014.01)
  *H01M 50/224*  (2021.01)
  *H01M 50/24*   (2021.01)
  *H01M 50/249*  (2021.01)

(52) U.S. Cl.
  CPC ......... *H01M 50/24* (2021.01); *H01M 50/249* (2021.01); *B60K 1/00* (2013.01); *B60R 13/0869* (2013.01); *B62D 21/15* (2013.01); *B62D 29/007* (2013.01)

(56) References Cited

U.S. PATENT DOCUMENTS

| | | | | |
|---|---|---|---|---|
| 3,530,029 A * | 9/1970 | Lemelson | ............ | B29C 44/326 425/506 |
| 5,118,026 A * | 6/1992 | Stacher | ............ | B21D 26/055 228/262.71 |
| 5,139,887 A * | 8/1992 | Sutton | ............ | B23K 20/00 428/586 |
| 5,516,600 A * | 5/1996 | Cherng | ............ | H01M 50/24 429/62 |
| 6,251,498 B1 * | 6/2001 | Fukushima | ............ | B60R 13/0876 428/920 |
| 7,866,531 B2 * | 1/2011 | Yang | ............ | B21D 47/00 228/112.1 |
| 9,054,402 B1 * | 6/2015 | Rawlinson | ............ | F41H 5/013 |
| 9,613,609 B2 * | 4/2017 | Caimi | ............ | E04B 1/86 |
| 9,623,742 B2 * | 4/2017 | Ikeda | ............ | B62D 25/2036 |
| 9,662,997 B2 * | 5/2017 | Nusier | ............ | H01M 50/24 |
| 9,868,361 B2 * | 1/2018 | Barbat | ............ | B60L 50/66 |
| 10,059,382 B2 * | 8/2018 | Nusier | ............ | H01M 50/229 |
| 10,084,166 B2 * | 9/2018 | Kerspe | ............ | H01M 10/613 |
| 10,189,227 B2 * | 1/2019 | Sachdev | ............ | B32B 27/08 |
| 10,799,976 B2 * | 10/2020 | Faruque | ............ | B62D 25/105 |
| 11,214,137 B2 * | 1/2022 | Stephens | ............ | B60L 50/66 |
| 2005/0084703 A1 * | 4/2005 | Ashmead | ............ | E04C 2/326 428/603 |
| 2005/0137087 A1 * | 6/2005 | Hodgson | ............ | B01J 35/04 502/527.22 |
| 2009/0029139 A1 * | 1/2009 | Schweiggart | ............ | F16L 59/08 428/220 |
| 2009/0075041 A1 * | 3/2009 | Schweiggart | ............ | B60R 13/0838 428/209 |
| 2009/0110949 A1 * | 4/2009 | Yang | ............ | B23K 20/123 228/112.1 |
| 2009/0158741 A1 * | 6/2009 | Wieres | ............ | B24B 19/26 72/340 |
| 2011/0108359 A1 * | 5/2011 | Nishimura | ............ | G10K 11/168 181/290 |
| 2011/0272960 A1 * | 11/2011 | Mizata | ............ | B60R 13/0861 296/39.3 |
| 2012/0141851 A1 * | 6/2012 | Hou | ............ | H01M 50/222 429/96 |
| 2015/0135939 A1 * | 5/2015 | Rawlinson | ............ | F41H 5/04 89/36.08 |
| 2015/0239331 A1 * | 8/2015 | Rawlinson | ............ | B62D 21/157 180/68.5 |
| 2016/0082544 A1 * | 3/2016 | Faruque | ............ | B21D 47/04 228/157 |
| 2016/0229308 A1 * | 8/2016 | Nusier | ............ | H01M 50/242 |
| 2016/0233468 A1 * | 8/2016 | Nusier | ............ | B60L 50/64 |
| 2017/0029034 A1 | 2/2017 | Faruque et al. | | |
| 2017/0047624 A1 * | 2/2017 | Gunna | ............ | H01M 10/6556 |
| 2017/0106625 A1 * | 4/2017 | Sachdev | ............ | B32B 27/32 |
| 2017/0106908 A1 * | 4/2017 | Song | ............ | B62D 35/02 |
| 2017/0259520 A1 * | 9/2017 | Alter | ............ | B31D 3/007 |
| 2017/0331086 A1 * | 11/2017 | Frehn | ............ | H01M 50/224 |
| 2018/0269447 A1 * | 9/2018 | Olfermann | ............ | H01M 50/224 |
| 2018/0323409 A1 * | 11/2018 | Maier | ............ | H01M 50/242 |
| 2018/0334022 A1 * | 11/2018 | Rawlinson | ............ | B60R 16/04 |
| 2018/0337374 A1 * | 11/2018 | Matecki | ............ | B60K 1/04 |
| 2019/0100090 A1 * | 4/2019 | Matecki | ............ | H01M 50/249 |
| 2020/0067156 A1 * | 2/2020 | Chi | ............ | H01M 10/625 |
| 2020/0398652 A1 * | 12/2020 | Stephens | ............ | B62D 25/025 |

FOREIGN PATENT DOCUMENTS

| | | | | |
|---|---|---|---|---|
| DE | 102010051374 A1 | | 4/2012 | |
| DE | 202013009788 U1 * | | 2/2014 | ......... H01M 10/613 |
| DE | 102016209105 A1 | | 12/2016 | |
| DE | 102016014191 A1 | | 5/2018 | |
| DE | 102017117696 A1 * | | 2/2019 | ............ B60K 1/04 |
| EP | 1652596 A2 | | 5/2006 | |
| EP | 2110189 A1 | | 10/2009 | |
| EP | 2565958 B1 | | 9/2015 | |
| KR | 20080060416 A * | | 7/2008 | ............ B21D 13/02 |
| WO | 9927142 A1 | | 6/1999 | |
| WO | 2012025594 A1 | | 3/2012 | |
| WO | WO-2012025594 A1 * | | 3/2012 | ............ B21D 13/02 |
| WO | 2017012850 A1 | | 1/2017 | |
| WO | 2018046207 A1 | | 3/2018 | |
| WO | 2018082898 A1 | | 5/2018 | |

OTHER PUBLICATIONS

KR20080060416A machine translation (Year: 2008).*
DE-202013009788-U1 translation (Year: 2014).*
DE-102017117696-A1 translation (Year: 2019).*

* cited by examiner

METHOD FOR MANUFACTURING A CRASH FRAME OF A BATTERY COMPARTMENT FOR BATTERY ELECTRIC VEHICLES

FIELD OF THE INVENTION

The present invention relates to a manufacturing method for a crash frame of a battery compartment for electric drive vehicles by using at least two flat metallic sheets which are arranged on top of one another, fixed together and which in a following step form a space by using an inner active media-forming process to create walls of a crash frame whereby the space works as a deformation space to protect the battery modules inside the battery compartment against an impact. Furthermore, it is possible to integrate further functionalities into the created inner space like heating elements, a fluid flow for cooling or measuring elements like sensors to analyze the system status of the crash frame. The invention further relates to the use of the crash frame for a battery compartment.

BACKGROUND

Parallel to the development of the automobile with combustion engines at the end of the 19$^{th}$ century, researchers also successfully developed electric vehicles like Werner von Siemens with his electrically powered carriage (1882). With the end of the 20$^{th}$ century and the changing frame conditions like a price increase and limitedness of fossil fuels, electric vehicles experience a renaissance. Beside the increase of the battery range, the topic of a safety integration of the battery compartment including the batteries is one dominating development aspect. This topic is called battery electric vehicle safety.

In general, electric drive vehicles are using an electric drive combined with entrained energy storage as a drive concept. Depending on the respective drive concept, electric drive vehicles can be divided into Battery Electric Vehicles (BEV) using purely electric power, Hybrid Electric Vehicles (HEV), Plug-in Hybrid Electric Vehicles (PHEVs) or Range Extended Electric Vehicles (REEV) combining an electric engine with combustion motor. Also Fuell Cell Vehicles (FCV) or Fuel Cell Hybrid Vehicles (FCHV) where the chemical stored energy in the form of hydrogen is changed into electric energy are one additional group of electric vehicles. As an energy storage system high-voltage batteries (accumulators) like a lithium ion batteries are used as a base cell and then interconnected to modules. Various modules are assembled to the final vehicle battery. The vehicle battery is protected by a battery compartment, also called battery housing, battery pack, battery case or battery cover.

Today the battery packs for electric vehicles are suffering under the heavy weight of the batteries, which has a direct impact to a lower range of the electric vehicles which has in turn a lower acceptance among buyers. At the same time the demanding crash requirements for side impact or against a pole underbody load make it necessary to use thick sheets and package-intensive die-cast components which has an additional negative effect on the car body weight and again on the range and buyer acceptance.

From the safety point of view, components like engine, gear and cooler of conventional vehicles with combustion engines form one part of the load paths and contribute therefore to the car body safety and stiffness as a whole. These components are not part of electric vehicles. Depending of the used vehicle design for an electric vehicle, further features like the centre tunnel can be omitted because of space requirements for the battery. As a consequence, one conventional load path gets lost. Additionally, high-voltage components must not be located in a load path. Further, the centre of gravity is moved to a lower position. The described points result in a smaller deformation space (also called crumble zone or crush zone) to absorb the crash energy and therefore present a challenge for the electric vehicle design. Because of the limited intrusion way in the underbody area where the battery compartment is mostly located, side-impacts as well as underbody crashes are critical to withstand. For state-of-the-art battery compartments manufactured as sheet structures, the local slitting of sharp-pointed objects like poles, bars or bollards from the underbody side is the most critical impact for the vehicle battery. Consequently, a contradiction of lightweight and safety exists especially for electric vehicles as one big drawback of the prior art. As a further drawback, state-of-the-art battery compartments are cost-intensive because of elaborate manufacturing what further increase the costs of BEVs. Another drawback is the limitation on aluminum extrusion profiles to reach the necessary component stiffness, but also to integrate further functionalities like cooling. Therefore, flat metallic sheets have a competitive disadvantage for this component regardless of their big industrial and worldwide cost-effective availability.

A state of the art execution example can be shown with the EP patent application 2565958B1 where only the battery housing is worked out without any crash or impact protection. The WO patent application 2017012850A1 describes a battery arrangement where a stiffening element connects different battery segments with each other to increase the side impact strength. A targeted area to absorb the impact energy is not described. In point of the underbody construction there is only a gap between the stiffening element and the underbody sheet metal part included. The DE patent application 102016209105A1 describes another battery pack system and integration whereby also for this arrangement a distance between the underbody sheet metal part and the battery pack is adjusted without any local protection against an underbody impact. The US patent application 2015239331A1 describes a system for absorbing and distributing the side impact energy utilizing an integrated battery pack. The way to absorb the side impact crash energy is executed by using side sills with multiple longitudinal channels. Lumens in the profile creating a distance between battery pack and battery bottom panel. The US patent application 2017029034A1 describes a battery assembly where shear pins or other deformable connectors secure edge reinforcements of a tray. During a side impact the shear pins break up and the tray moves laterally away from the impact zone. In this case a gap is constructed between the outside rocker and the battery assembly. The US patent application 2016233468A1 describes a battery enclosure which is surrounded by internally reinforced cylindrical impact absorbing elements. For all here mentioned patent applications, the battery pack is adjusted without any local protection against an underbody impact. Further the US patent application 2016229308A1 describes a battery housing which is protected by T-shaped guides on the outer surface for stiffeners and absorbing elements. The attachments are orientated to extend either in a horizontal or vertical orientation. Moreover, the WO patent application 2018082898A1 describes a battery housing consisting of tube parts which are brought into engagement by means of the assembly flanges thereof facing each other. Another battery compartment in the form of a tray part is pointed out in the WO patent application 2018046207A1 with a special designed edge section to increase the usable housing volume. For both patent applications, the fulfillment of crash or impact requirements is not solved and therefore both housings cannot autonomously protect themselves or the contained battery modules.

Beside the increase of the battery range and the way how to protect the batteries in the case of crashes and intrusions, the topic of integration further functionalities like a thermal management system or sensor technology to measure surrounding conditions or the battery status acquires increasing importance. The necessity to integrate also a thermal management system for cooling and heating into the battery compartment structure can be explained with the degree of efficiency for temperature-sensitive lithium-ion drive batteries which amounts to 95%. The remaining 5% represent lost heat and must be led away especially under higher surrounding temperatures or during high-voltage loading because at battery temperatures over 35° C., the charging capacity of the batteries decreases and the aging process is speeded-up. In general, there are two ways to create a cooling system: A direct cooling system which is integrated into the battery compartment and has direct, more efficient contact with the battery cells, or an indirect cooling system. The latter surrounds the battery compartment and therefore indirectly cools the whole compartment without a danger of a short circuit in the case of a leakage.

There exist different methods to create stiff and lightweight structures manufactured with flat metal sheets as initial materials. One example is given in the WO patent application 2012025594A1 where at least two layers are used and in which at least one layer is structured with reinforcement elements, and the sheets are joined together with a stacked orientation.

An other forming process established in the manufacturing industry to create complex-formed components is the method of internal high pressure forming which is standardized in DIN8584 or VDI-guideline VDI3146 and can be classified into the group of tensile compression forming manufacturing processes. It can be further differentiated by the use of the semi-finished products into internal high pressure forming of tubes or profiles, internal high pressure forming of singular sheets or internal high pressure forming employing at least two sheets or more. The present invention falls into the last category. Moreover, internal high pressure forming can be divided by the active medium used which can be a fluid or a gas. Because of using an active medium, the process is also called "inner active media forming". The method of can be carried out as a cold-forming operation which means working at room temperature or just with the inherent warming of the equipment during serial production (T≤120° C.), or as a conscious decision using higher temperatures up to 1100° C. which is then called hot forming or semi hot forming, like pointed out in WO patent application 9927142A1. To realize a cost-efficient solution reaching cost-effective component costs and using simple equipment, only the method of cold forming is used within the method of the present invention. One big advantage of an inner active media forming process is that the active medium works without friction so that no wear and abrasion results, which reduces repair costs over production lifetime. Also, no special lubricant, forming foil or coated tool is necessary, which is a further cost benefit especially when using stainless steels with their chromium-oxid-passivation layer surface and higher wear- and heat-resistance. Furthermore, the process using an inner active media forming allows a smoother thinning-out of the sheets combined with a larger-scaled forming load. As a result, the material manufactured to a component shows a lower level of preloading, lower danger of local failure because of geometry notch effects and a lower local stress concentration. In the prior art, the method of inner active media forming is used to create stiff but also lightweight housing in non-transportation applications, especially with a view to pressure vessels, tanks, containers or heat collectors. The DE102010051374A1 describes a pressure vessel where hollow plates are used. One example of using hydroforming inside transportation applications is given in the CN patent application C206938686U, where a crash-proof roof beam energy-absorbing box is formed out of an open tube-shape. Further, the method of inner active media forming is used for design elements like the Zieta Plopp design chair (https://zieta.pl/plopp-family/) where two thin steel sheets are welded together around their edges and inflated under high pressure to give a 3D object. The EP patent application 2110189A1 describes a method for dieless forming of a sheet metal whereby a bordering element which is connected with at least one of at least two formed sheet metal elements limits the deformation of the sheet metal elements during forming.

Therefore, the object of the present invention is to eliminate some drawbacks of the prior art and to provide a manufacturing method for a stiff, lightweight but primary crash-resistant and easily producible crash frame for a battery compartment for electric drive vehicles by using at least two flat metallic sheets which are arranged on top of one another, fixed together and in a following step form a space in an inner active media forming process to create walls of a crash frame, whereby said space works as a deformation space to protect the battery modules inside the battery compartment against an impact.

SUMMARY OF THE INVENTION

The invention is defined by what is disclosed in the independent claim. Preferable embodiments are set out in the dependent claims.

DETAILED DESCRIPTION

In accordance with the objective of the present invention, the vehicle battery or rather the group of battery modules are covered by a battery compartment, preferably shaped as a bowl or a container which is integrated into a crash frame manufactured using an inner active media forming process which provides a deformation space and thus a protection space for impact intrusion. For this, at least two metallic sheets are arranged on top of one another whereby different design concepts are possible. Preferably, planar sheets are used. In an embodiment of the invention, the sheets overlap completely. Also linear as well as non-linear overlapping sheets originating from patchwork blanks are possible to apply in the method of the present invention. In a next step, the sheets arranged in the described way are fixed to each other, preferably essentially along the circumference of at least one sheet, and sealed. For this, a seal seam welding procedure like a laser beam welding, TIG or plasma welding, GMAW welding or resistance roller seam welding can be used. Thereby, different weld shapes and type of joints are possible, depending on the used welding method. For a laser beam process, an edge joint was successfully used during tests as well as a lap joint. Also for welding processes without a filler metal like a TIG or a plasma welding process, an edge weld was suitable to create a sealed seam. The usage of an additional filler metal is optional but not necessary and makes sense especially in components subject to high pressure or high stress, whereby they stabilize in a geometric but also a metallurgical way if a ductile austenitic filler metal is used, more preferably an austenitic stainless steel filler metal like 1.4370 or 1.4316. Moreover, it is not necessary to weld on the front surface of the at least two sheets. Especially for one preferred embodiment where an additional area to seal the battery compartment with its cover plate against external liquids or dust is prepared, a lap joint configuration with a protruding area is suitable. Furthermore, it is also possible to use a forming procedure like folding as a non-welding procedure to fix at least one area of the circumference and thus sealingly fix the arranged sheets without thermal input, welding fumes and welding splatters.

An inlet valve must be adapted to one of the sheets so that an inner active media forming process can follow where the area between the arranged sheets is pressurized with a non-compressible medium like water. Also water-based solutions like a water-oil-emulsion fulfill the method of the present invention. Furthermore, cooling fluids like a coolant, a refrigerant or a liquid with added frost protection can be used for the forming process with the benefit of a later usage during component lifetime and then to work as a cooling media and therefore to influence positively the range of the batteries. For the method of the present invention, the inner active media forming is preferably a sheet metal hydroforming method according to DIN8584, optionally by using mold-halves as forming tools for the geometry, but more preferably a geometry- and weld seam-depending free forming without any tools to decrease component cost and machine investment. To avoid the need for tools into which the sheets can be pressed with the inner active media forming process, the geometry must be influenced by the sheet design, sheet thickness and material strength. Sometimes, the usage of clamping devices is necessary to support the shaping.

To influence the resulting component geometry with the sheet design, it is preferable to add welds as limitation elements. It is suitable to use rounded geometries like circular resistance spot welds or similar geometries like a rectangular geometry with rounded edges prepared by laser beam welding to limit the affecting loads on the limitation elements during the inner active media forming. Therefore, a radius in the range 5.0 mm≤r≤12.5 mm shows the best ratio to withstand the loads and to enable a homogeneous liquid flow. With these welded limitation elements, the arranged sheets are fixed together. As a result, the limitation elements limit the possible height $h_i$ of the inner space between the arranged sheets and determine the resulting geometry. To prepare a good compromise of a compact package but with enough intrusion space as a safety criterion during an impact, the height $h_i$ of the created inner space should be in the range 10 mm≤$h_i$≤180 mm, more preferably in the range 30 mm≤$h_i$≤120 mm. Further, the distance of the limitation elements to each other or the outer edge should be in the range 30 mm≤$d_L$≤100 mm.

The sheet thickness of the single flat metallic sheets should be t≤4.0 mm to enable lightweight, more preferably in the range 0.6 mm≤t≤2.0 mm Thinner designs cannot withstand an impact situation during the component lifetime and expand too much with a too high inner space during manufacturing. To create a component design where the battery modules can be introduced onto a flat surface, it is suitable to use thinner outer sheets with at the same time thicker inner sheets, so that the outer sheets are deformed the most during the inner active media forming process. Therefore, the thickness ratio of the internally located sheet having contact with the battery modules to the externally located sheet should be $r_t$≥2.0, more preferably 2.5≤$r_t$≤3.5, to enable a flat contact to position the battery modules. Even under an impact situation during component lifetime, the thinner outer sheet will be deformed and absorb a high level of the impact energy by intruding into the deformation space.

As materials used as flat metallic sheets, strain-hardenable, heat- and corrosion resistance austenitic stainless steels are suitable for the method of the present invention, more preferably high-strength austenitic stainless steels having a yield strength $R_{P0,2}$≥400 MPa. With austenitic stainless steels it is possible to withstand the corrosion requirements of the underbody vehicle area also without a cathodic dip-coating process which reduces the total component costs further and improve the life cycle environmental impact. Further, the mentioned stainless steels have acid- and heat resistant properties which further protects the occupants in situations with higher-load impacts. During fire tests of inflamed batteries, austenitic stainless steels withstand temperatures up to a temperature of 1,000° C. over 12 minutes which also enables the arriving rescue teams to rescue trapped occupants. By using high strength stainless steels, it is possible to have a higher resistance against an intrusion combined with the high ductility of the materials which enables high energy absorption. The characteristic of strain-hardening gives the engineer the possibility to reach the final strength level during component manufacturing, in this case after the inner active media forming process.

Also martensitic steels, preferably martensitic stainless steels with a chromium content≥12%, show a high potential for the method of the present invention. For this case, the component is manufactured with martensitic steels in annealed delivery condition, followed by an indirect press-hardening process of the component. With the target of a good ecological behavior of the manufactured battery compartment, the usage of stainless steel as a consistent material for the whole compartment enables a complete recyclability and processing after component lifetime inside electric arc furnaces to create further products out of stainless steel. Thereby, within the group of stainless steel it is possible to combine different subgrades like the austenitic and martensitic grades mentioned above. To further support the idea of a corrosion resistance and ductile, energy absorbing outer element, an austenitic stainless steel supports the needed properties. At the same time, the thicker inner part could be a press-hardened martensitic grade with a higher strength but a lower corrosion resistance.

The same parameters (sheet design, sheet thickness, material strength) influence the necessary forming pressure. The adjusted pressure level varied depending on the used sheet thickness and sheet strength between 40 and 120 bar.

Figure 3:
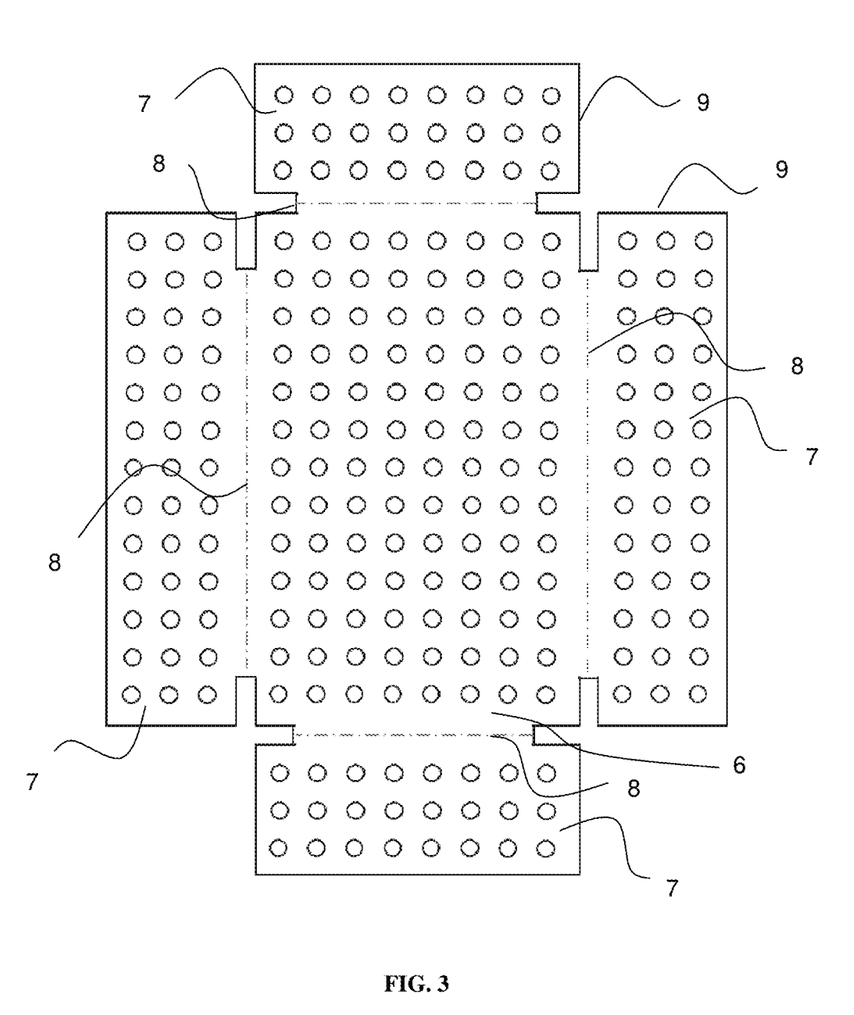
FIG. 3 shows another schematic top view of a flat metallic sheet-arrangement as another embodiment of the invention for bend-forming.

As a preferred embodiment of the present invention, the sheet design is prepared in a way that different areas of the crash frame can be realized with a single sheet arrangement. FIG. 3 demonstrates one preferred sheet design where an underbody wall as well as different side walls can be worked out of the formed component by using a bend-forming process. As a result, every wall side excluding a closing cover are manufactured out of prefabricated flat metallic sheets and are bend-formed to a one-side open frame after an inner active media forming process. During a subsequent step, the created wall sides can be welded together at their edges or also designated as contact surfaces to realize a tight frame. This step can be omitted if the internally located battery compartment with the integrated battery modules is a sealed bowl or container. On the other hand, it is also possible just to manufacture different single components with the inner active media forming process and then to weld at least two single components tightly together. A further embodiment, preferably for the underbody wall or bottom, is to arrange two single components on top of each other to create at least two independent inner spaces used for different functionalities, preferably the outer one as a crash protection and the inner one for thermal management. For this case, the free inner space with the defined height $h_i$ is used by adding auxiliary materials for further or increased functionalities. One way to create additional properties is to fill up at least a certain proportion of the deformation space with an insulating material as a further crash and thermal protection for the internally located battery modules. From there, typical auxiliary materials are preferably insulating foams like polyurethane assembly foams used as cavity and hole filling.

Another way to add further functionalities is to integrate thermal functions like heating by means of electric resistance heating elements, or cooling with a cooling fluid, or measuring elements like sensors for measuring temperature, deformation or system status. In the case of an integrated heating, technical knitwear or technical fabrics manufactured out of metal wires, preferably a copper alloy, can be applied and installed between the metal sheets before welding and inner active media forming. Such knitwear uses the physical operating principle of electric resistance heating (Law of Joule).

The functionality of the crash frame for a battery compartment manufactured with the method of the present invention is independent from its mounting position within the electric drive vehicle. Preferably the battery compartment is located over the whole underbody to ensure a maximum battery range, a low centre of gravity and balanced driving dynamics. But also localized constructions like one-side compartments, front or rear-positioning will also work. Thereby the left and right-hand vehicle side (side impact) and the bottom side (underbody slitting) are the preferred sides for using the described crash frame and its manufacturing method. But depending on the location of the battery system, any other vehicle side can become important for safety. It is well known from state-of-the-art vehicles like Hybrid Electric Vehicles that battery compartments could be also positioned behind the rear seat structure or backseat bench. In this case, only the back side and the bottom side must be fully protected. The side areas can be optionally protected by structures manufactured according to the method of the present invention, but depending on the vehicle construction just partially. Moreover, it is possible for Hybrid Electric Vehicles to integrate into the crash frame of the present invention beside the battery compartment also the fuel or hydrogen tank, to have a single crash frame for the whole energy storage.

The crash frame manufactured with the method of the present invention is able to withstand autonomously a crash or impact situation and therefore to protect the internally located battery modules. That results in further weight reduction and cost advantages for the overall electric drive vehicle because the surrounding vehicle parts can be reduced in weight. As one example, the rocker panel covering the battery housing can be designed thinner.

BRIEF DESCRIPTION OF THE DRAWINGS

The present invention is illustrated in more detail referring to the attached drawings where.

EMBODIMENTS ILLUSTRATING THE INVENTION

Figure 1:
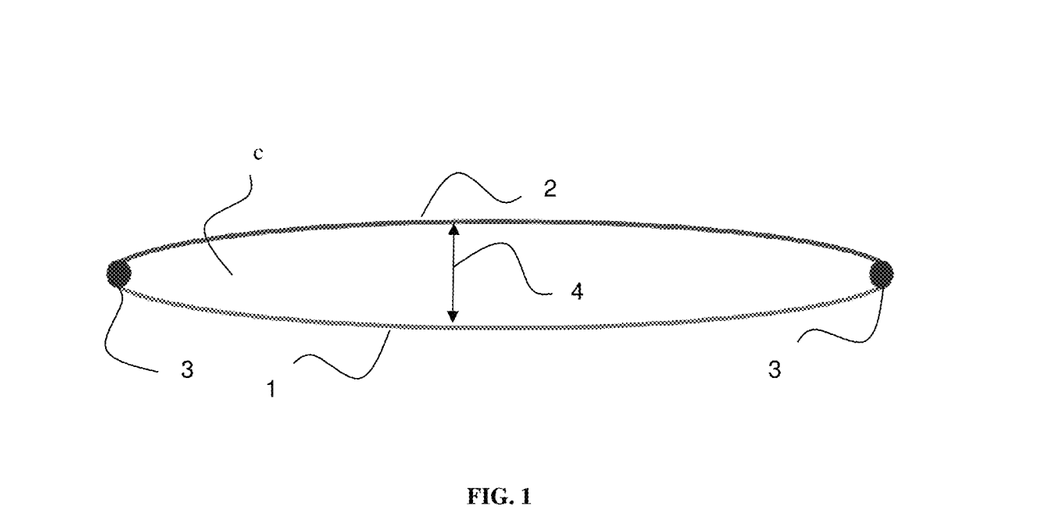
FIG. 1 shows a schematic side view of one wall of a battery compartment having a crash frame manufactured out of two flat metallic sheets by using an inner active media forming process as one embodiment of the invention.

FIG. 1 illustrates two flat metallic sheets 1, 2 which are arranged on top of one another, then welded together at locations 3 and which form, by using an inner active media forming process, a defined inner space with the height $h_i$ 4 so that a unitary wall element results which can be used for a battery compartment and is further called "component" (c).

Figure 2:
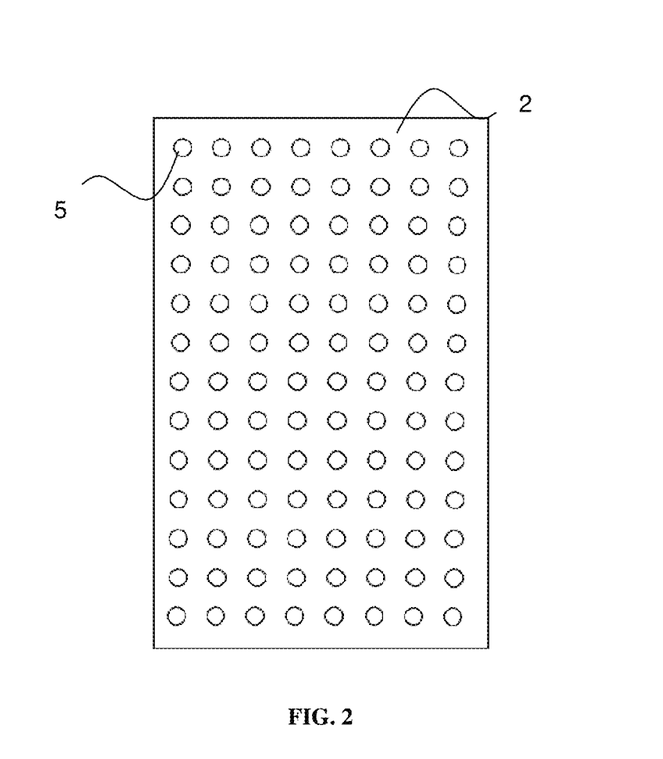
FIG. 2 shows a schematic top view of another wall as another embodiment of the invention.

FIG. 2 illustrates another embodiment of the invention to manufacture a component which can be used for a battery compartment, schematically seen as a view from above to the surface of a sheet 2, whereby limitation elements 5 created by welding are introduced. At these limitation elements 5, the sheets 1, 2 are fixed together. As a result, the limitation elements 5 limit the possible height $h_i$ of the space and determine the resulting geometry.

FIG. 3 illustrates, as a top view, that a component as basically described in FIG. 2 can be manufactured to form a battery compartment with a bottom wall 6 and different side walls 7 by using a bend-forming process at the bending lines 8. The resulting side walls 7 can be welded together at their contact surfaces 9.

Figure 4:
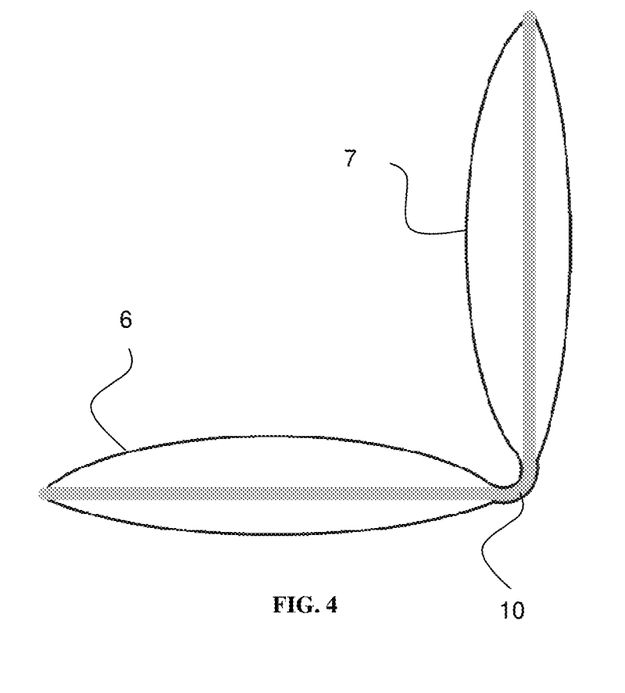
FIG. 4 shows a schematic side view of an arrangement where a component manufactured from two metallic sheets according to the invention has been bent to form two walls of a crash frame for a battery compartment.

FIG. 4 shows in a side detail view how a component manufactured according to the invention, e.g. as shown in FIG. 3, has been bent at a straight angle to form a bottom 6 and a side wall 7, respectively, of a crash frame. Alternatively, separate single components as described in FIGS. 1 and 2 can be welded together at 10 to create a resulting battery compartment crash frame with a bottom wall and side walls.

Figure 5:
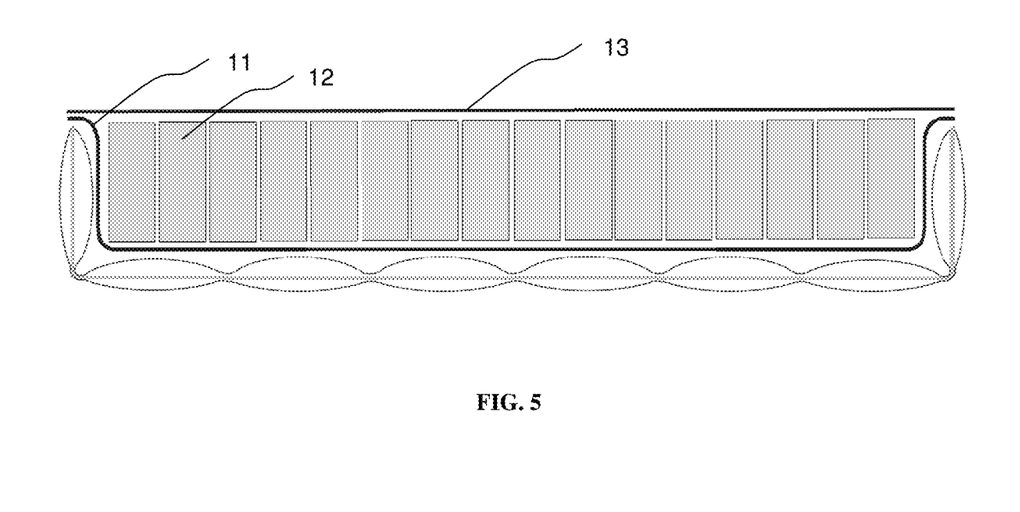
FIG. 5 shows a schematic side view of a battery compartment as a preferred embodiment of the invention.

FIG. 5 illustrates how a component manufactured according to the invention, as shown in e.g. FIG. 3, has been bent to form a crash frame, into which a battery housing 11 is inserted with installed battery modules 12. The system is covered by a closing plate 13.

Figure 6:
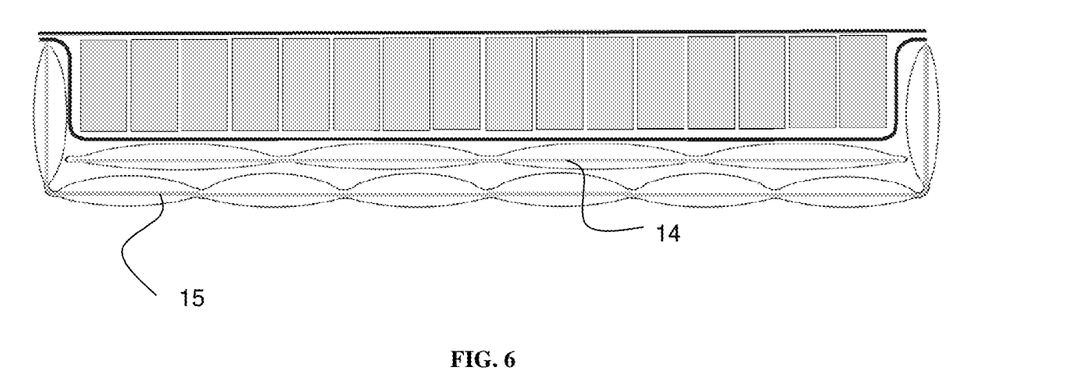
FIG. 6 shows a schematic side view of another battery compartment having a crash frame according to another preferred embodiment of the invention.

FIG. 6 illustrates the arrangement of two separate components 14, 15 arranged on top of each other to create at least two independent inner spaces used for different functionalities, preferably the outer one 15 as a crash protection and the inner one 14 for thermal management functions like cooling.

Figure 7:
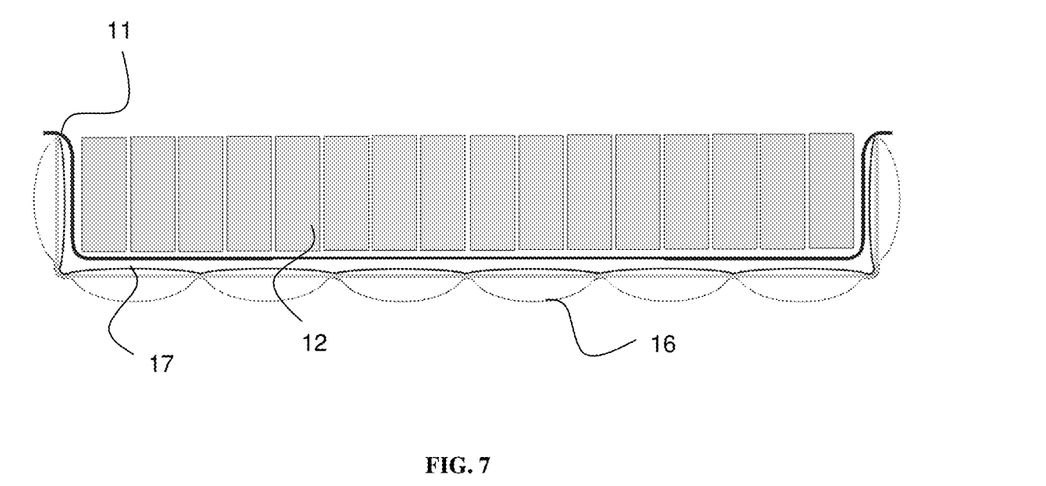
FIG. 7 shows a schematic side view of a battery compartment manufactured in accordance with a further embodiment of the invention.

FIG. 7 illustrates as a side view the use of thinner outer sheets 16 in combination with thicker inner sheets 17 so that mainly the outer sheets are deformed during the inner active media forming process. The battery modules 12 in casing 11 can be assembled onto the nearly flat thicker inner sheet 17.

Figure 8A:
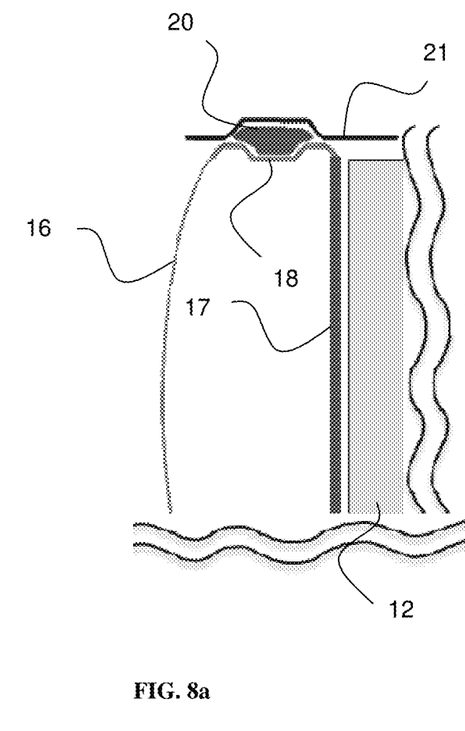
FIG. 8 shows two detailed drawings of preferred sealing embodiments schematically seen from a side view.
Figure 8B:
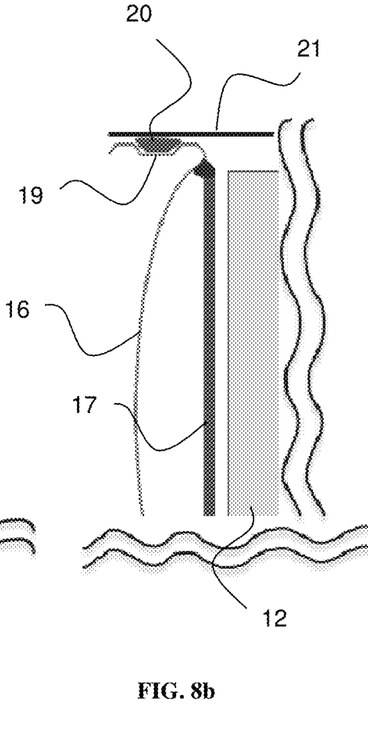

FIG. 8a-b illustrate as detail side views of two sealing embodiments at the side walls, providing a closed battery compartment. Both embodiments comprise a thinner outer sheet 16, a thicker inner sheet 17 and the internally located battery modules 12. Further, indentations 18, 19 are provided in the outer surface of the internal active media-formed side walls to create spaces for a sealing layer 20 so that a removable closing plate 21 can be fixed tightly onto the battery compartment. In FIG. 8a, the indentation 18 is created by impressing the internal active media-formed side wall from the outside of the thinner outer sheet 16. In FIG. 8b, the indentation 19 is created by having a thinner outer sheet 16, the edge of which protrudes outside the thicker inner sheet 17 and is subsequently formed to accommodate the seal material 20.

Figure 9:
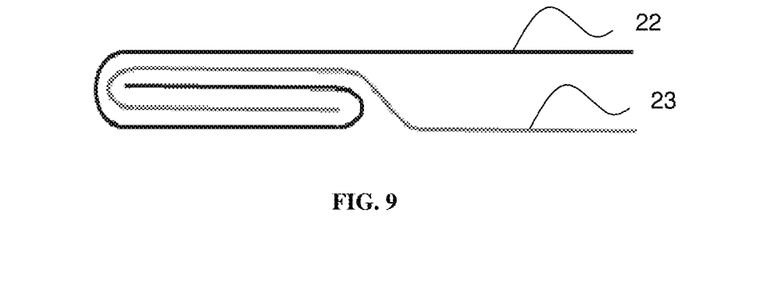
FIG. 9 shows an option for seaming two metal sheets together in connection with a process according to the invention.

FIG. 9 illustrates the fixing of at least one area of the circumferential fixing with a non-welding forming procedure, here folding. Two flat metallic sheets 22, 23 arranged on top of one another are bent and folded into each other, creating a sealed seam along their circumference.

The invention claimed is:

1. A method for manufacturing a crash frame for a battery compartment for electric drive vehicles, the battery compartment including the crash frame and a battery housing, the battery housing enclosing at least one battery module, the method comprising the steps of:
   providing at least two metallic sheets and arranging the at least two metallic sheets on top of each other;
   joining the at least two metallic sheets together essentially at the circumference of at least one sheet to form joined sheets;
   introducing a medium between at least two sheets of the joined sheets;
   applying a pressure to the medium, causing a deformation of at least one sheet of the joined sheets; and
   producing a crash frame including a plurality of wall components, each of the wall components comprising the joined sheets and a deformation space between the at least two sheets, the deformation space produced by the deformation of the at least one sheet;
   wherein producing the crash frame includes:
      after forming the deformation space, bending the joined sheets along at least one bend line to form the plurality of wall components joined at the at least one bend line;
   wherein the crash frame including the plurality of wall components is configured such that in an installed position, the battery housing is inserted into the crash frame.

2. The method according to claim 1, wherein the at least two metallic sheets are essentially planar.

3. The method according to claim 1, further comprising the joined sheets being joined by welding or folding.

4. The method according to claim 1, the step of bending the joined sheets further comprising a step of bending the joined sheets along at least two axes to produce the crash frame, the crash frame having at least a bottom wall and side walls.

5. The method according to claim 1, wherein the plurality of wall components together form a first wall component including a first deformation space, the method further comprising:
   forming a second wall component including a second deformation space,
   arranging the second wall component on top of the first wall component providing the crash frame including independent first and second deformation spaces.

6. The method according to claim 1, wherein the deformation space is adapted for use for thermal management of a battery compartment inserted into the crash frame.

7. The method according to claim 1, wherein indentations for accommodating a sealing compound are provided in a wall of the crash frame.

8. The method according to claim 1, further comprising the step of filling up the deformation space with an insulating material, the deformation space filled with the insulating material adapted for use as a further crash and thermal protection for a battery compartment inserted into the crash frame.

9. The method according to claim 1, wherein the metallic sheets are stainless steel.

10. The method according to claim 1, the plurality of wall components including a bottom wall and at least one side wall of the crash frame.

11. The method according to claim 1, the method further comprising:
   joining the plurality of wall components to produce the crash frame, the crash frame having at least a bottom wall and side walls.

12. The method according to claim 11, wherein the joining is being carried out by welding.

13. The method according to claim 1, wherein the at least two metallic sheets having different thicknesses.

14. The method according to claim 13, wherein the sheet having a larger thickness defines an inside surface of the crash frame configured to receive a battery compartment inserted into the crash frame.

15. The method according to claim 1, wherein the plurality of wall components together form a first wall component, the method further comprising: forming a second wall component; the crash frame including the first wall component and the second wall component; the first wall component forming a bottom wall and side walls of the crash frame; layering the second wall component on top of the bottom wall and within the side walls such that with the battery housing inserted into the crash frame, the second wall component is intermediate the battery housing and the bottom wall.

16. The method according to claim 15, wherein the second wall component is adapted for use for thermal management of the battery compartment.

* * * * *